United States Patent
Herrmann

(10) Patent No.: US 7,715,311 B2
(45) Date of Patent: May 11, 2010

(54) POINT-TO-MULTIPOINT DATA TRANSMISSION

(75) Inventor: Christoph Herrmann, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 619 days.

(21) Appl. No.: 10/569,255

(22) PCT Filed: Aug. 19, 2004

(86) PCT No.: PCT/IB2004/051490

§ 371 (c)(1),
(2), (4) Date: Feb. 21, 2006

(87) PCT Pub. No.: WO2005/020521

PCT Pub. Date: Mar. 3, 2005

(65) Prior Publication Data
US 2007/0002786 A1 Jan. 4, 2007

(30) Foreign Application Priority Data
Aug. 26, 2003 (EP) .................................. 03102649

(51) Int. Cl.
*H04L 12/28* (2006.01)
(52) U.S. Cl. .................. 370/227; 370/226; 370/329; 370/388; 370/386; 370/387
(58) Field of Classification Search .................. 370/312, 370/331–332, 226, 227, 329, 388, 386, 387, 370/225; 714/748
See application file for complete search history.

(56) References Cited

U.S. PATENT DOCUMENTS

| | | | |
|---|---|---|---|
| 4,285,064 A | 8/1981 | Hodge | |
| 5,457,808 A | 10/1995 | Osawa et al. | |
| 5,463,382 A | 10/1995 | Nikas et al. | |
| 5,493,722 A | 2/1996 | Gunn et al. | |
| 5,613,215 A | 3/1997 | Grube et al. | |
| 5,689,081 A | 11/1997 | Tsurumi | |
| 5,931,964 A * | 8/1999 | Beming et al. | 714/748 |
| 6,182,144 B1 | 1/2001 | England | |
| 6,411,810 B1 | 6/2002 | Maxemchuk | |
| 6,603,796 B1 | 8/2003 | Kondo | |

(Continued)

FOREIGN PATENT DOCUMENTS

EP 1248480 A 10/2002

OTHER PUBLICATIONS

"Reliable Multicast Protocol with a Representative Acknowledgment Scheme for Wireless Systems" by Inoue et al.*

*Primary Examiner*—Pankaj Kumar
*Assistant Examiner*—Yosief Berhane

(57) ABSTRACT

The initial transmission of data packets in a point-to-multipoint communication network may often be delayed when retransmissions of erroneously decoded data packets are required. According to an aspect of the present invention, point-to-multipoint data transmission and retransmission of erroneously decoded data from a transmitting station to a plurality of receiving stations is performed, where retransmitted data is sent via at least one communication channel, which is different from the one used for the initially transmitted data. Advantageously, due to this there may be no need for further communication between the transmitting station and the receiving stations. Furthermore, according to an aspect of the present invention, the initial transmission of data packets is not delayed by retransmissions.

14 Claims, 3 Drawing Sheets

U.S. PATENT DOCUMENTS

| | | | |
|---|---|---|---|
| 6,671,260 B1* | 12/2003 | Engstrand | 370/238 |
| 7,333,457 B2* | 2/2008 | Gopalakrishnan et al. | 370/335 |
| 7,369,517 B2* | 5/2008 | Dillinger et al. | 370/310 |
| 2002/0046379 A1* | 4/2002 | Miki et al. | 714/749 |
| 2002/0071407 A1* | 6/2002 | Koo et al. | 370/335 |
| 2002/0164986 A1* | 11/2002 | Briand et al. | 455/442 |
| 2003/0207696 A1* | 11/2003 | Willenegger et al. | 455/522 |
| 2003/0220119 A1* | 11/2003 | Terry | 455/466 |
| 2003/0223394 A1* | 12/2003 | Parantainen et al. | 370/336 |
| 2003/0228865 A1* | 12/2003 | Terry | 455/422.1 |
| 2004/0116143 A1* | 6/2004 | Love et al. | 455/522 |
| 2004/0248579 A1* | 12/2004 | Fukui et al. | 455/450 |
| 2005/0021833 A1* | 1/2005 | Hundscheid et al. | 709/236 |
| 2006/0166653 A1* | 7/2006 | Xu et al. | 455/412.2 |

* cited by examiner

POINT-TO-MULTIPOINT DATA TRANSMISSION

The present invention relates to point-to-multipoint or multicast data transmission. More particularly, the present invention relates to a method for performing point-to-multipoint data transmission, a communication system, a transmitting station and a receiving station.

A point-to-multipoint communication network basically comprises a transmitting station and a plurality of receiving stations. Data is transmitted by a multicast signal (i.e. the sender once sends this signal, which is decoded by all receiving stations) from the transmitting station to the receiving stations via a multicast communication channel established by means of a communication medium. Upon decoding the data, each receiving station may send a feedback signal back to the transmitting station, the feedback signal comprising information with respect to whether the received data could be decoded error-free or not. By receiving the feedback information, the transmitting station may decide whether a retransmission for a respective data packet is required or not.

The expression "retransmission for a (data) packet" is used here in order to state that the retransmitted bits do not necessarily form an exact copy of the bits, which were sent in the initial transmission of the packet. Retransmissions can be either full copies of the initially transmitted packet, or a retransmission can contain different data, e.g. only additional parity bits, which together with the received bits of the initially transmitted packet are considered in the decoding process (this is an example for non-self-decodable incremental redundancy). A general example for so-called self-decodable redundancy would be that the retransmission contains all systematic bits, but a different set of parity bits compared to the initial transmission.

In contrast to this, "retransmission of data" is used here to denote both "a retransmission of a (data) packet" (i.e. an exact copy of the data packet is retransmitted) and "a retransmission for a (data packet) (i.e. an exact copy of the data packet is retransmitted or the bits carried in the retransmission differ from the bits of the initial transmission).

Various multicast communication networks are known.

U.S. Pat. No. 4,285,064 relates to time division multiple access satellite communications.

U.S. Pat. No. 5,457,808 discloses a point-to-multipoint communication network, which comprises a transmitting station and a plurality of receiving stations for transmitting a multicast signal from the transmitting station to the receiving stations and which is capable of retransmitting at least a portion of the multicast signal from the transmitting station to a failing station, which fails among the receiving stations to receive the portion. This point-to-multipoint communication network includes multicast communication means for establishing communication channels between said transmitting station and said receiving stations and for transmitting a multicast signal over said communication channels and retransmitting means for selecting one of said communication channels between said transmitting station and said failing station and for transmitting said portion over said one of the communication channels.

It is an object of the present invention to provide for an improved point-to-multipoint data transmission.

According to an exemplary embodiment of the present invention as set forth in claim 1, the above object may be solved by a transmission of data from the transmitting station to the plurality of receiving stations via a first communication channel, a switching of the first channel in the transmitting station from the first communication channel to a second communication channel and a retransmission of the data via the second communication channel.

Throughout this document, the term "switching from a first communication channel to a second communication channel" includes that after this switching both the first and the second communication channel are available, i.e. the transmitting station sends data on both, and a receiving station may decode both the first and the second communication channel, if required because it needs retransmissions for a previously sent packet. In other words, switching from a first communication channel to a second communication channel in the context of this document means, for the transmitting side, that the second communication channel is switched on, in addition to the first communication channel, while keeping the first communication channel and e.g. continuing sending new data via this first communication channel for the receiving side, that reception or decoding of the first communication channel is continued, while the receiving side in addition starts to receive or decode the second communication channel.

In other words, according to this exemplary embodiment of the present invention, a transmission method for point-to-multipoint or multicast transmission of data is provided, the method being capable of retransmitting transmitted data, wherein the data has been transmitted from the transmitting station to a group of receiving stations via a first communication channel and wherein the data is retransmitted from the transmitting station to the group of receiving stations via the second communication channel. Simultaneously with the retransmission on the second communication channel, new data may be transmitted via the first communication channel.

According to this exemplary embodiment of the present invention, this may be achieved by performing a first channel switching in the transmitting station from the first communication channel to the second communication channel after transmission of the data and before retransmission for the data. It may be stated that first and second communication channels form a point-to-multipoint channel set used for performing multicast transmission.

Advantageously, according to this exemplary embodiment of the present invention, the retransmission of the data does not interfere with the transmission of other data, since the retransmission takes place on a different communication channel.

According to another exemplary embodiment of the present invention as set forth in claim 2, the data is sent as a data packet and a channel switching is performed in at least one second receiving station of the plurality of receiving stations from the first communication channel to the second communication channel. The at least one second receiving station, which performs the second channel switching, erroneously decoded the data packet and, for this reason, performs the second channel switching. First and second channel switchings are performed in accordance with a first and a second switching scheme, wherein the first switching scheme and the second switching scheme correspond to each other.

Advantageously, the method according to this exemplary embodiment of the present invention provides for a retransmission for a data packet, which has been erroneously decoded by at least one second receiving station, without feedback communication between all the second receiving stations and the transmitting station. This omission of feedback signaling saves valuable resources, i.e. channel load and time and saves energy which may be in particular advantageous for wireless networks.

According to another exemplary embodiment of the present invention as set forth in claim 3, the delay time interval between the data packet transmission and the data packet retransmission is predefined and set forth in the first and second switching schemes. Due to this, the at least one second receiving station "knows" when the retransmission is to be expected. No signaling is necessary since the delay time is set forth in the second switching scheme. The predefined delay time interval between the transmission of the data packet and the retransmission for the data packet may provide enough time for performing the first and second channel switching in the transmitting station and the plurality of receiving stations respectively.

According to another exemplary embodiment of the present invention as set forth in claim 4, a data packet transmission of a respective data packet is carried out on the first communication channel, if the data packet is a new data packet which has not yet been transmitted. According to an aspect of this exemplary embodiment of the present invention, the first communication channel is always and only used for primary or initial transmission of data packets, i.e. data packets, which are transmitted for the first time. Therefore, no retransmission for a data packet will be carried out on the first communication channel, while retransmissions are still ongoing on the second communication channels, which means that a receiving station, which listens exclusively to the first communication channel, usually only receives primary or initial data, i.e. data which is transmitted for the first time, and does not receive secondary data, i.e. data which has already been transmitted for a first time and is now being retransmitted. First or initial transmission of data is therefore performed via the first communication channel and there is no interference with the secondary or retransmitted data or data packets. Also, due to this, advantageously, in case a receiving station could not decode the initial data, it knows that it may receive the retransmission on the second communication channel.

According to another exemplary embodiment of the present invention as set forth in claim 5, a receiving station from the plurality of receiving stations which erroneously decoded a data packet, sends a negative acknowledgement message to the transmitting station via a third communication channel. Furthermore, the transmitting station will not perform a retransmission for the data packet if the transmitting station did not receive the negative acknowledgement message from the receiving station. According to this exemplary embodiment of the present invention, a retransmission for a respective data packet only occurs if a receiving station erroneously decoded the respective data packet and the retransmission for the respective data packet does not occur if every receiving station of the plurality of receiving stations decoded the respective data packet successfully. It should be noted that alternatively, a receiving station of the plurality of receiving stations may send a positive acknowledgement message to the transmitting station via a third communication channel, if the respective receiving station decoded the data packet successfully, and that, when the transmitting station receives a positive acknowledgement from all the receiving stations from the plurality of receiving stations, no retransmission for the data packet is performed by the transmitting station.

According to another exemplary embodiment of the present invention as set forth in claim 6, there is provided a plurality of second communication channels, via which retransmissions of a data packet are performed. Furthermore, according to this exemplary embodiment of the present invention, each of the retransmissions of the plurality of retransmissions is carried out via a different communication channel of the plurality of second communication channels, as defined in the first and second switching schemes.

In other words, a retransmission for a respective data packet may be performed more than once, wherein the first retransmission for the respective data packet is performed via a second communication channel of the plurality of second communication channels, and wherein a second retransmission for the respective data packet is performed via another second communication channel of the plurality of second communication channels, etc. For each of the retransmissions of the plurality of retransmissions, a different communication channel of the plurality of second communication channels is used. Which channel is used for which retransmission is set forth in the first and second switching schemes.

Advantageously, according to an aspect of the present invention, a receiving station, which erroneously decoded a respective data packet, may switch to a communication channel of the plurality of second communication channels, according to the second switching scheme, in order to receive a retransmission for the respective data packet. If the retransmission for the respective data packet failed or if the retransmitted respective data packet has been erroneously decoded by the respective receiving station, the respective receiving station may switch to another, different communication channel of the plurality of second communication channels, according to the second switching scheme. The transmitting station also switches to the other communication channel of the plurality of second communication channels according to the first switching scheme. After that, a second retransmission for the respective data packet is performed via this other communication channel of the plurality of second communication channels, etc.

Advantageously, following this protocol, there is no need for communication between the transmitting station and the plurality of receiving stations, since each receiving station knows at all times, which data packet is transmitted or retransmitted via which communication channel of the first communication channel and the plurality of second communication channels, as defined in the first and second switching schemes.

According to another exemplary embodiment of the present invention as set forth in claim 7, retransmissions of different data packets are performed simultaneously via different communication channels of the plurality of second communication channels, and simultaneously with the transmission of new data packets via the first communication channel. Advantageously, this may allow to increase the data transmission rate and reduce the delay.

According to another exemplary embodiment of the present invention as set forth in claim 8, the plurality of receiving stations within reach of the transmitting station is partitioned into groups of receiving stations with comparable or similar channel conditions of the first and second communication channels. According to this exemplary embodiment of the present invention, point-to-multipoint or multicast data packet transmission is performed for each group individually. Advantageously, by grouping receiving stations with comparable or similar channel conditions and by performing point-to-multipoint data packet transmission for each group individually, the channel load for a particular group may be reduced, since no retransmission of data may be required for that particular group, and the resulting delay gets smaller, the better the channel conditions of a group are.

According to another exemplary embodiment of the present invention as set forth in claim 9, transmission of a data packet and retransmission for the data packet is performed via a wireless communication link. According to an aspect of this exemplary embodiment of the present invention, the transmitting station and the plurality of receiving stations may be connected by a communication medium, which may include a transponder on board an artificial satellite. But it should be noted, that any other form of wireless communication link may be used, according to the present invention.

According to another exemplary embodiment of the present invention as set forth in claims 10 and 11, the method is an extension of the Hybrid Automatic Repeat Request (hereinafter referred to as "HARQ") protocol in the Universal Mobile Telecommunications System (hereinafter referred to as "UMTS") or is applied in the context of 3rd Generation Partnership Project Frequency Division Duplex (hereinafter referred to as "3GPP FDD") mode. The 3GPP FDD mode provides a High Speed Downlink Shared Channel (hereinafter referred to as "HS-DSCH"), which can be used with code multiplexing, i.e. within one slot it is possible to transmit data to the same user using several codes. Instead of using several codes to increase the data rate of within one slot, each code channel may be used as one of the channels of a point-to-multipoint channel set. By applying HARQ type II and III, the retransmissions may carry only incremental (e.g. non-self-decodable) redundancy, so that the interference generated by the additional code channels used for the retransmissions becomes smaller than that of an additional code channel, which carries self-decodable redundancy, since incremental redundancy may need a smaller number of bits than self-decodable redundancy. In addition, the spreading factor on the code channel, that is used for an initial transmission in parallel to retransmission for earlier packets on different parallel code channels, may be increased so that for this initial transmission a smaller packet is carried in order to further reduce the overall interference resulting from the new transmission in parallel to retransmissions for earlier packets, which interference impacts neighboring cells and is generated by the cell, in which this HS-DSCH is modified so that point-to-multipoint transmission is possible. Currently point-to-multipoint transmission is not possible according to 3GPP TS 25.321 "3rd Generation Partnership Project; Technical Specification Group Radio Access Network; Medium Access Control (MAC) Protocol Specification (Release 5) Version 5.5.0".

According to other exemplary embodiments of the present invention as set forth in claims 12, 13 and 14, a communication system is provided for performing point-to-multipoint data packet transmission from a transmitting station to a plurality of receiving stations. The transmitting station is adapted to transmit a data packet from the transmitting station to the plurality of receiving stations via a first communication channel and the transmitting station is adapted to perform a first channel switching in the transmitting station from the first communication channel to a second communication channel and to retransmit the data packet via the second communication channel. Furthermore, the plurality of receiving stations is adapted to receive the data packet transmitted from the transmitting station and to perform a second channel switching in at least one second receiving station of the plurality of receiving stations from the first communication channel to the second communication channel. The at least one second receiving station, which performs the second channel switching, erroneously decoded the data packet and thus needs a retransmission of the data.

It may be seen as the gist of an exemplary embodiment of the present invention that any initial data is transmitted via an n-th channel and each i-th retransmission of the data for receiving stations which could not decode the preceding transmission is retransmitted via an (n+i)-th channel. Due to this, the receiving stations know where to find (receive) the transmitted data. Hence, the signaling between the transmitting station and the receiving stations may be reduced or even completely omitted. Advantageously, this reduces interference and may save energy, in particular in wireless transmission systems.

These and other aspects of the present invention will become apparent from and elucidated with reference to the embodiments described hereinafter.

Exemplary embodiments of the present invention will be described in the following, with reference to the following drawings.

For the description of FIGS. 1 to 6, the same reference numerals are used for the same or corresponding elements.

Figure 1:
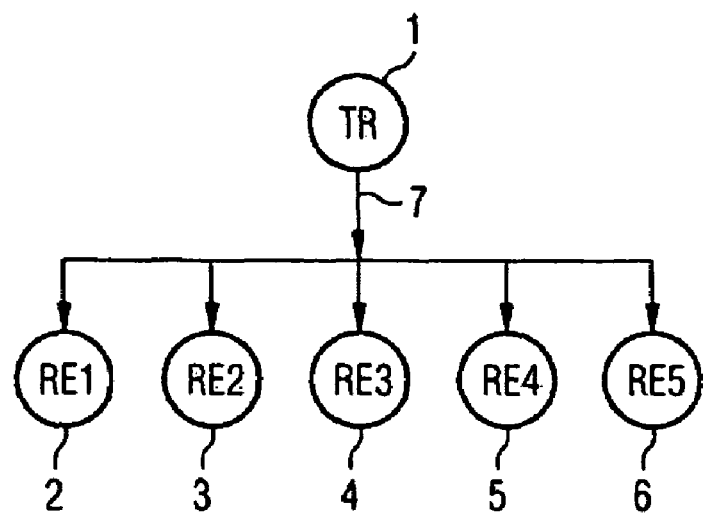
FIG. 1 shows a schematic representation of a communication system for performing point-to-multipoint data packet transmission according to an exemplary embodiment of the present invention.

The communication system for performing point-to-multipoint data packet transmission from a transmitting station to a plurality of receiving stations, as depicted in FIG. 1, comprises a transmitting station 1 and a plurality of receiving stations 2, 3, 4, 5 and 6. The transmitting station 1 performs a point-to-multipoint or multicast transmission of data to the receiving stations 2, 3, 4, 5 and 6 via a communication link 7. According to an exemplary embodiment of the present invention, communication link 7 is a wireless communication link. Data may be transmitted from the transmitting station 1 to the receiving stations 2, 3, 4, 5 and 6. Transmission of data from the transmitting station 1 to the receiving stations 2, 3, 4, 5 and 6 is performed in terms of a point-to-multipoint or multicast transmission, using a multicast transmission channel for the transmission of data packets. The communication system may be a cellular mobile communication system such as a GSM-network or a UMTS network. It could also be a wireless Local Area Network (LAN).

Figure 2:
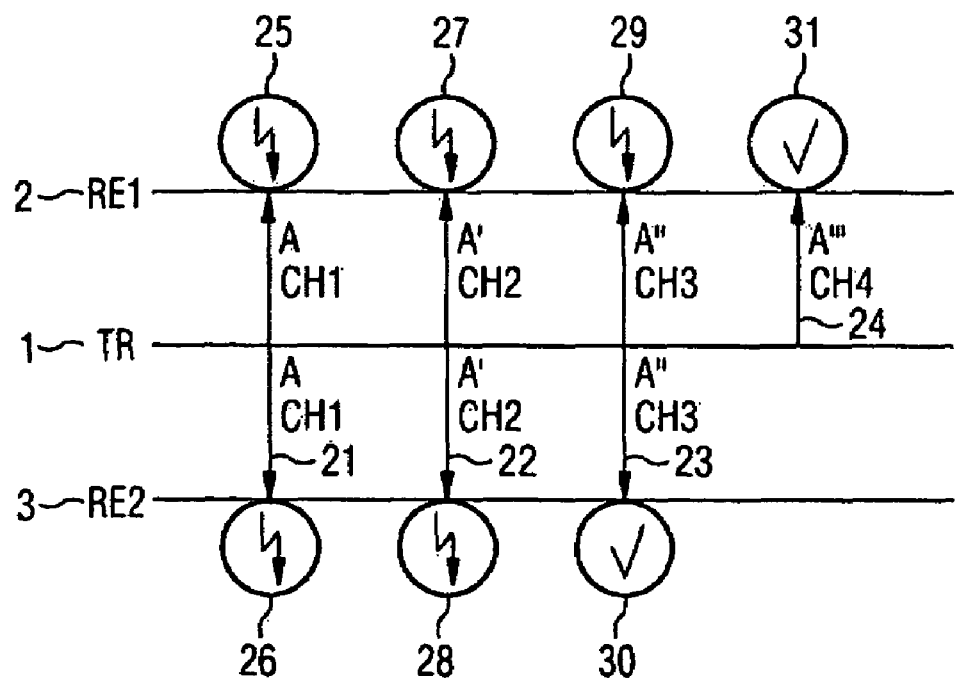
FIG. 2 shows a simplified timing chart, depicting a transmission and a plurality of retransmissions of a data packet from a transmitting station to two receiving stations in the communication system depicted in FIG. 1 in accordance with an exemplary embodiment of the present invention.

FIG. 2 shows a simplified timing chart of an exemplary embodiment of a method of operating the communication system of FIG. 1 according to the present invention.

Figure 5:
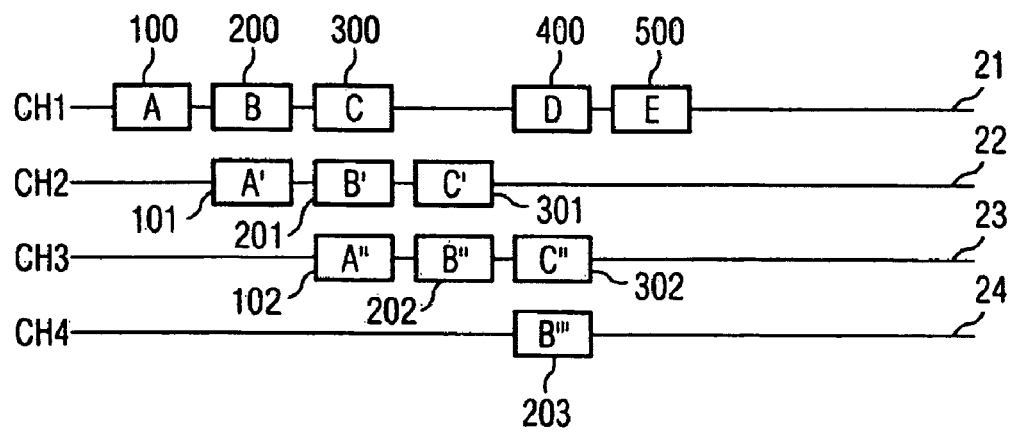
FIG. 5 shows a schematic representation of the transmission of data packets and retransmission for these data packets from a transmitting station according to an exemplary embodiment of the present invention.

In FIG. 2 and in FIG. 5, capital letters A, B, C, D and E refer to an initial transmission of data packets A, B, C, D and E, respectively. Capital letters A', B', C', D' and E' refer to a first retransmission for data packets A, B, C, D and E, respectively. Accordingly, A", B", C", D" and E" refer to a second retransmission for data packets A, B, C, D and E, respectively, etc.

Transmitting station 1 transmits via a point-to-multipoint transmission on a first multicast communication channel 21 a data packet A to a plurality of receiving stations 2, 3. Receiving station 2 and receiving station 3 do not decode the transmitted data packet A successfully, as indicated by thunderbolts 25 and 26. Then, a first channel switching is performed in the transmitting station 1 according to a first switching scheme, meaning that for the first retransmission A' for the data packet A, a second multicast communication channel is used, while the first multicast communication channel 21 is still used for initial transmissions of new data packets. Furthermore, a second channel switching is performed in each of the receiving stations 2 and 3, according to a second channel switching scheme, wherein the first switching scheme corresponds to the second switching scheme. This second channel switching means that the receiving stations 2 and 3 continue to decode or receive the first multicast communication channel 21, and start to decode or receive the second multicast communication channel 22.

According to an aspect of this exemplary embodiment of the present invention, the channel switching may be performed during a delay time interval between the transmission of data packet A and a successive first retransmission A' for the data packet A. The delay time interval is set forth in the first and second switching schemes. After the delay time interval, during which a channel switching may be performed in transmitting station 1 and receiving stations 2 and 3 from the first channel 21 to second channel 22, the transmitting station 1 sends the retransmission A' for the data packet A to the receiving stations 2 and 3 via the second channel 22, while a new data packet B is sent simultaneously via the first channel 21. Unfortunately, both receiving stations 2 and 3 are not able to decode the retransmitted data packet A' successfully, as indicated by the thunderbolts 27 and 28. Then, a third and fourth channel switching is performed in the transmitting station 1 and the two receiving stations 2 and 3 respectively. The third channel switching in the transmitting station 1 is performed according to the first channel switching scheme, and the fourth channel switching in the receiving stations 2 and 3 is performed according to the second channel switching scheme. According to the first and second channel switching schemes, the transmitting channel of the transmitting station 1 (for sending the second retransmission for data packet A) and the receiving channels of the two receiving stations 2 and 3 (for receiving the second retransmission for the data packet A) are switched to a third channel 23, while the first channel is still available for transmission of a new data packet, and the second channel is available for transmitting a retransmission for the data packet B. Again, the third and the fourth channel switching is performed during a delay time interval between the first retransmission A' for the data packet A and a second retransmission A" for the data packet A, as well as between the transmission of B and the first retransmission B' for B. After the third and fourth channel switching, a second retransmission A" for the data packet A is performed by the transmitting station 1 via a third multicast channel 23, while simultaneous sending of the retransmission B' is performed via the second multicast channel 22, and the sending of a new data packet C is performed via the first multicast channel 21. Again, receiving station 2 erroneously decodes the data packet, as indicated by thunderbolt 29, but receiving station 3 successfully decodes the data packet A", as indicated by checkmark 30. In a further step, a fifth channel switching is performed in the transmitting station 1 and a sixth channel switching is performed in the receiving station 2, both during a predefined delay time interval, as set forth in the first and second switching schemes. According to the first and second switching schemes, both the transmitting station 1 and the receiving station 2 switch channels for transmission respectively reception of the third retransmission A'" for data packet A to a fourth channel 24. Then, a third retransmission A'" for the data packet A takes place, while simultaneously a possibly necessary second retransmission B" for data packet B is done via the third multicast channel 23, a possibly necessary first retransmission C' of data packet C is done via the second multicast channel 22, and a new transmission of a data packet D is done via the first multicast channel 21. The retransmitted data packet A'" is only received and decoded by receiving station 2, not by receiving station 3, since receiving station 3 decoded data packet A" successfully.

As may be seen from FIG. 2, the location or order of the retransmission of the data is set forth in the first and second channel switching schemes. These first and second channel switching schemes are known to the transmitting station and the receiving stations. Due to this, in case a receiving station is unable to decode a data packet, it knows from the second channel switching scheme where, i.e. at which channel the next retransmission takes place. Hence, a complex notification messaging from the transmitting station to the receiving stations may be omitted. Furthermore, only those receiving stations switch to the second channels for decoding the retransmitted data which erroneously decoded the precedent transmission (initial transmission). The receiving stations which could decode the initial transmission error free may remain on the first channel. This may allow to avoid an unnecessary, energy consuming decoding of retransmitted data, which is not needed.

Figure 3:
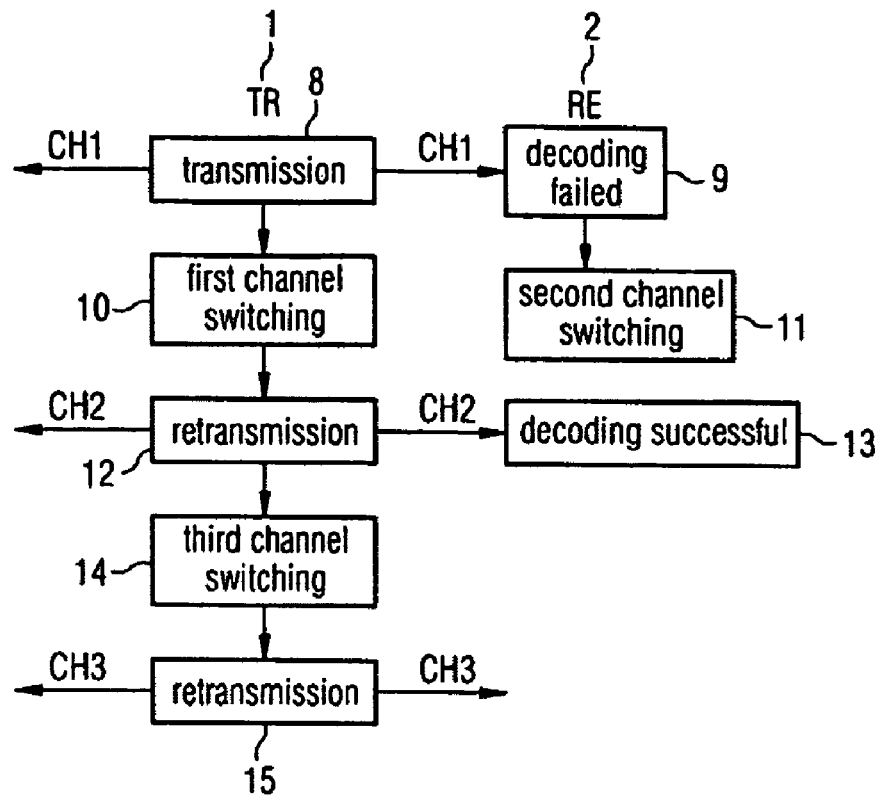
FIG. 3 shows a flowchart of an exemplary embodiment of a method according to the present invention.

The flowchart depicted in FIG. 3 shows an exemplary embodiment of a method for performing point-to-multipoint data transmission according to the present invention as it may be implemented in the communication system of FIG. 1. Transmitting station 1 transmits a first new data packet 8 to a receiving station 2 via a first channel CH1. The receiving station 2 fails to decode 9 the transmitted data packet successfully. Then, a channel switching 10, 11 is performed in the transmitting station 1 and the receiving station 2, respectively. Both channel switchings 10 and 11 are performed according to a respective first and second channel switching scheme. After this switching, the first channel CH1 is available for transmission in the transmitting station 1 (and for reception in the receiving station 2) of a second new data packet. In the next step, a retransmission 12 for the first new data packet is performed (simultaneously with the transmission of the second new data packet via CH1) by the transmitting station 1 via a second channel CH2, after which the receiving station 2 decodes the retransmitted data packet successfully 13. Again, a channel switching 14 is performed in the transmitting station 1, followed by a second retransmission 15 of the data packet via a third multicast transmission channel CH3. This channel switching 14, in addition, comprises that after this switching, CH1 is available in the transmitting station 1 for transmitting a third new data packet, and CH2 is available in the transmitting station 1 for transmitting a first retransmission for the second new data packet. However, since the decoding 13 of the first retransmission for the first new data packet done via CH2 has been performed successfully, no second channel switching involving CH3 is performed in the receiving station 2 and therefore the second retransmission 15 for the first new data packet via channel CH3 is not received in the receiving station 2 und thus does not need to be decoded. The receiving station 2 might perform a second channel switching involving CH2 so that it is available for reception of the first retransmission for the second new data packet, depending on whether the initial or primary transmission of the second new data packet was received error-free. This is not shown in FIG. 3.

Another receiving station might have requested the second retransmission for the first new data packet, and this receiving station then does perform the second channel switching also involving CH3, so that in this other receiving station CH1 is available for reception of the third new data packet, CH2 is available for reception of the first retransmission for the second new data packet, and CH3 is available for reception of the second retransmission for the first new data packet.

As set forth so far, the mechanism for conveying retransmissions makes use of a set of N+1 multicast channels, where the first channel carries a new transmission of a data packet, and the i-th (i=2, . . . , N+1) channel in the set carries in a slot the (i−1)-th (i=2, . . . , N+1) retransmission for a packet.

Figure 4:
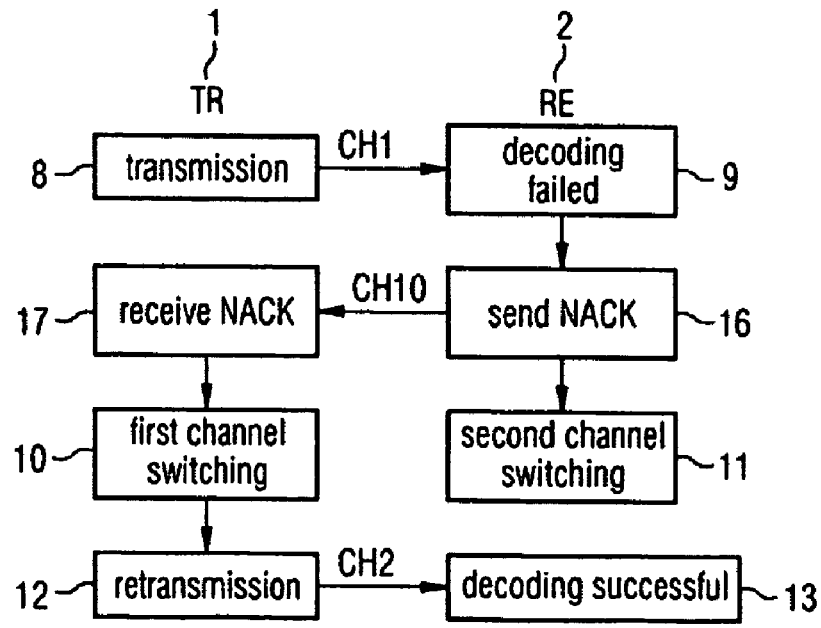
FIG. 4 shows a flowchart of another exemplary embodiment of a method according to the present invention.

FIG. 4 shows a flowchart of another exemplary embodiment of a method for performing point-to-multipoint data transmission according to the present invention as it may be implemented in the communication system of FIG. 1.

The transmission scheme depicted in FIG. 4 corresponds to the transmission scheme depicted in FIG. 3, except that the receiving station 2 may send a negative acknowledgement 16 to the transmitting station 1, whenever the decoding 9 of a transmitted data packet 8 fails. For this, a feedback channel may be provided between the receiving stations and the transmitting station. The primary transmission 8 of a first new data packet is performed via a first multicast channel CH1, from the transmitting station 1 to the receiving station 2. After realizing that the decoding of the data packet transmission 8 failed, the receiving station 2 sends a negative acknowledgement NACK 16 back to the transmitting station 1 via a channel CH10, which may be a point-to-point feedback channel e.g. a random access channel, which other receiving stations can also use in order to convey their feedback signaling. The transmitting station 1 receives the negative acknowledgement NACK 17 and a first channel switching 10 is performed in the transmitting station 1 according to the first channel switching scheme. A second channel switching 11 is performed in the receiving station 2 in accordance with a second channel switching scheme which may coincide with the first channel switching. It should be noted that first and second channel switching schemes may correspond to each other, in the sense that the switchings follow each other, i.e. the transmitting station is switched to the same channels as the receiving stations such that there is a time period where the transmitting stations and the receiving station are switched to the same channel. After these channel switchings 10 and 11, CH1 is available (on the transmitting station) for transmission (and on the receiving stations for reception) of the second new data packet CH2 is available (on the transmitting station) for transmission (and on the receiving stations for reception) of the first retransmission for the first new data packet.

It should be noted that each initial transmission of new data packets may always be carried out via the first communication channel. Every recipient or receiving station, which does not need a retransmission for a particular data packet, only listens to the first channel. If a receiving station fails to successfully decode a particular data packet, it may switch to the respective retransmission channel according to the second switching scheme. There is no need for communication between the transmission station 1 and the receiving station 2 concerning the channel number, which is used for a particular retransmission for a data packet, since the time and the channel number of each retransmission is pre-set in the first and second switching schemes. This is particularly important in the case of applications of the HARQ type II or III, since then each receiving station comprises one or more soft buffers, wherein the contents of the soft buffer are soft-combined using the additional retransmissions. By so doing, the channel number on which the retransmission is received implicitly indicates the soft buffer, the contents of which have to be soft-combined with the data received via this particular channel.

FIG. 5 shows a schematic representation of the transmission of new data packets and retransmission for data packets from a transmitting station via four point-to-multipoint channels 21, 22, 23 and 24 according to an exemplary embodiment of the present invention as it may be implemented in the communication system of FIG. 1. The multicast channel used for the primary or initial transmission of a new data packet is called first channel 21 or CH1. All four channels in the set are assumed to be slotted, in the sense that one data packet is carried within one slot. In a first step, data packet A is transmitted for the first time via first point-to-multipoint or multicast channel 21 as indicated by reference numeral 100. Then, the transmitting station continues to send a new data packet B via first multicast channel 21 (as indicated by reference numeral 200) and additionally sends the first retransmission for data packet A (A') in parallel via multicast channel 22 (as indicated by reference numeral 101), to which only those receiving stations listen, which expect a retransmission for data packet A, because they failed to decode data packet A successfully. The transmitting station may be informed via a feedback channel by some or all of the receiving stations, which could not successfully decode the data packet A, that they need a retransmission for data packet A. Similarly, if in the next slot, data packet B (and/or A taking into account A' possibly—by softcombining—together with A) cannot be decoded successfully by at least one receiving station, they inform the transmitting station about the need for a retransmission B' for data packet B and/or a second retransmission A" for A, and hence B' is transmitted via multicast channel 22 (as indicated by reference numeral 201) and A" is transmitted via multicast channel 23 (as indicated by reference numeral 102). At the same time, a new data packet C is transmitted via first multicast channel 21 (as indicated by reference numeral 300). In a further step, a first retransmission C' for data packet C is transmitted and a second retransmission B" for data packet B has to be sent. C' is transmitted via multicast channel 22 (as indicated by reference numeral 301) and B" is transmitted via multicast channel 23 (as indicated by reference numeral 202). On the other hand, data packet A has been successfully decoded by all receiving stations and therefore does not need to be retransmitted for a third time.

The gap between transmission of data packet C (reference numeral 300) and D (reference numeral 400) may e.g. be because no more data is available on the transmitting side at that point-in-time or for another reason. The gap could also be missing, i.e. transmission of data packet D would happen in the next slot after transmission of data packet C, and simultaneously with the retransmissions C' (reference numeral 301) and B" (reference numeral 202).

From a different perspective, with the timing shown in FIG. 5, if the i-th retransmission carried on the (i+1)-th channel is sent in the y-th slot, where numbering of the slots of the first communication channel is the same as for each communication channel of the plurality of second communication channels, the initial transmission of this packet was done in the (y−i)-th channel. This relationship of slots and transmissions as well as serial numbers of retransmissions for a data packet is part of the first and second switching scheme.

Figure 6:
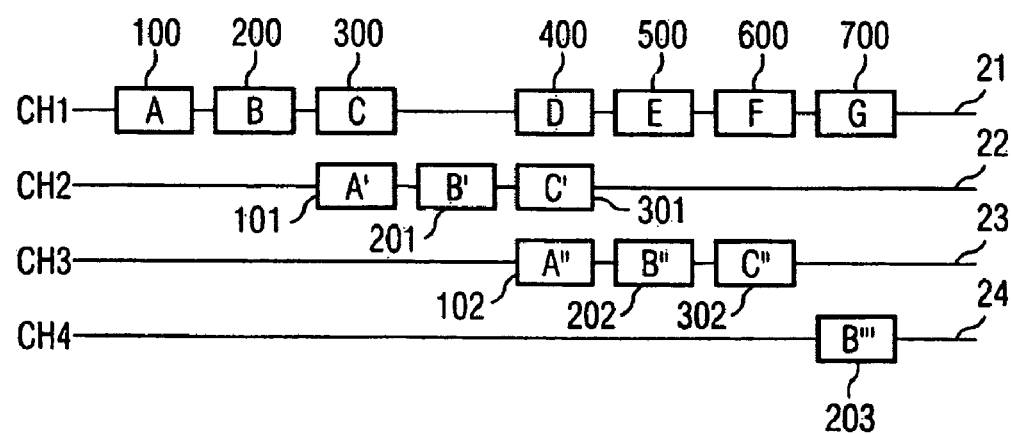
FIG. 6 shows a schematic representation of the transmission of data packets and retransmission for these data packets from a transmitting station according to an exemplary embodiment of the present invention taking into account longer delay faced by the transmitting station for receiving feedback information from some or all of the receiving stations.

Depending on how long it takes until the transmitting station has received feedback from some or all receiving stations, it can be necessary to delay the retransmission for a data packet. This is shown in FIG. 6, which assumes that it takes the duration of one slot after the reception of a data packet, until the transmitting station can initiate a retransmission for this data packet, because it has received the feedback concerning this packet from some or all receiving stations. Hence, the transmitting station sends data packets A (reference numeral 100) and B (reference numeral 200) via the first channel CH1 (reference numeral 21), which is used for new data. During the second slot (counted from the initial transmission of data packet A), in which packet B is transmitted from the transmitting station to the receiving stations, the transmitting station receives the feedback concerning packet A from the receiving stations, and finds out that a retransmission is required for data packet A. This retransmission A' (reference numeral 101) is then initiated in the third slot and sent via the second channel CH2 (reference numeral 22) used to convey the first retransmission, and simultaneously with this, the new data packet C (reference numeral 300) is transmitted via CH1 (reference numeral 21). Accordingly, the retransmission B' (reference numeral 201) for data packet B (reference numeral 200) is sent in the fourth slot, after receiving the feedback for data packet B in the third slot. The feedback for the first retransmission A' of data packet A is then received during the fourth slot as well as the feedback for the retransmission C', indicating that a second retransmission A" for data packet A and a first retransmission C' for data packet C are needed. Simultaneously with an initial transmission of a new data packet D (reference numeral 400) via CH1 (reference numeral 21), the first retransmission C' (reference numeral 301) for data packet C is done via CH2 (reference numeral 22) and the second retransmission A" for data packet A is done via CH3 (reference numeral 23). In FIG. 6 it is assumed that the following new transmissions of data packets D, and E (reference numerals 400 and 500) do not need retransmissions. For packet F and G (reference numerals 600 and 700), FIG. 6 does not make an assumption, since they would have to come later than the time that is covered by the figure.

The gap between transmission of data packet C (reference numeral 300) and D (reference numeral 400) may e.g. be because no more data is available on the transmitting side at that point-in-time or for another reason. The gap could also be missing, i.e. transmission of data packet D would happen in the next slot after transmission of data packet C, and simultaneously with the retransmission B' (reference numeral 201).

From a different perspective, with the timing shown in FIG. 6, if the i-th retransmission carried on the (i+1)-th channel is sent in y-th slot, where numbering of the slots of the first communication channel is the same as for each communication channel of the plurality of second communication channels, the initial transmission of this packet was done in the (y−2·i)-th channel, e.g. if the slot number on CH2 for the second retransmission B" (reference numeral 202) for B is 6, the initial transmission of B is found on CH1 in slot (6−2·2)=2 (reference numeral 200). This relationship of slots and transmissions as well as serial numbers of retransmissions for a data packet is part of the first and second switching scheme.

For informing the transmitting station that A has now been successfully received by all receiving stations, the known feedback scheme ACK/NACK may be applied. Since in one slot several packets are received, multiple ACKs/NACKs may have to be conveyed, one for each decoded multicast channel in the multicast channel set. A straight forward implementation could be providing in the direction to the transmitting station after a slot, in which data packets and retransmissions are received, as many phases as there are multicast channels in the multicast channel set. In each phase, in a random access fashion, the receiving stations convey an indication whether the decoding on the channel, to which the phase refers, resulted in an error or not.

As an alternative, one feedback message concerning the decoding result on each decoded channel of the multicast channel set can be conveyed preferably on a point-to-point channel which is exclusively assigned between the receiving stations and the transmitting stations. With such feedback, advantageously, retransmission may be stopped when all receiving stations could decode the data packet.

In a further step a new data packet D is transmitted via multicast channel 21 (as indicated by reference numeral 400) and data packets B and C are retransmitted for the third and second time respectively. The second retransmission for data packet C (C") is performed via channel 23 (as indicated by reference numeral 302) and the third retransmission for data packet B (B'") is performed via multicast channel 24 (as indicated by reference numeral 203). In a further step, data packet E is transmitted for the first time via first multicast channel 21 (as indicated by reference numeral 500). No additional transmission via the parallel multicast channels 22, 23, 24 is performed, since all previously transmitted data packets A, B, C and D have been successfully decoded by each receiving station of the plurality of receiving stations.

The following rule may be applied for each data packet transmission:

Any initial or first transmission of a respective data packet is performed via first multicast channel 21 and each retransmission for the respective data packet is carried out via a different multicast communication channel of a plurality of multicast communication channels, which does not include channel 21. The channel switchings in the transmitting station and the receiving stations are defined in the first and second switching schemes, respectively.

If, at a certain time, a receiving station notices that it did not successfully decode data packet B, it may switch to multicast channel 23 and receive the second retransmission for data packet B (B") in step 4, without the need for additional signaling.

Advantageously, the above described method of a point-to-multipoint set of channels implicitly contains the information on the maximum number of retransmissions possible. Given that N+1 channels are defined in the channel set of this scheme, each receiving station knows that after receiving N retransmissions of a data packet, no further retransmission will occur and it has to accept that this data packet will not be received error-free. In case of HARQ type II and III, the receiving station may then flush the soft buffer for this packet, in order to use the soft buffer for the next new packet to be transmitted.

Advantageously, the number of receiving stations does not influence the number of parallel multicast channels. Therefore, the above described method has a major advantage over point-to-point transmission schemes, when a bigger number of receiving stations is involved, and each receiving station receives the multicast data via a point-to-point channel, i.e.— for each receiving station—via a channel, which only this receiving station decodes.

The physical channel used for the first retransmission is called MC-ReTx-Ch 1 (multicast retransmission channel 1), that of the second is called MC-ReTx-Ch 2, that of the N-th transmission MC-ReTx-Ch N. The multicast channel for the initial transmission of a new packet is called MC-Ch. All channels in the set are assumed to be slotted in the sense that within one slot, one packet is carried.

After the first transmission of packet A to a plurality of recipients, for example, ten recipients, four still need a retransmission to correctly decode packet A. To organize the retransmissions, as may be taken from FIG. 5, any initial transmission of a data packet is sent via MC-Ch and the i-th retransmission for a packet is carried out via MC-ReTx-Ch (i), i.e. the channel for the i-th and the (i+1)-th retransmission is different.

The shifting of the channels to carry the retransmissions may be required for reasons of avoiding signaling, which indicates which of the channels in the channel set is a new packet, and which carries the i-th retransmission for a packet previously sent (i=1, 2, ..., N).

Advantageously, in the concept described with reference to FIG. 5 and FIG. 6, the point-to-multipoint channel set implicitly contains information with respect to the maximum number of retransmissions possible: Given that N+1 channels are defined in the channel set of this scheme, each recipient or receiving station knows that after receiving N retransmissions for a packet (and this retransmission was carried out on MC-ReTx-Ch N), no further retransmission will take place, and it has thus to accept that this packet will not be received error-free, unless the transmitting station decides based on the feedback from the receiving stations, to initiate a new initial or primary transmission of the otherwise lost packet via MC-Ch. This may change the sequence of the data packets in the receiving stations, and hence a sequence number is required, which is carried in each data packet. Based on this sequence number, the receiving station can reorder the received packets to reconstruct their original sequence, as described e.g. in 3*GPP TS* 25.321 "*3rd Generation Partnership Project: Technical Specification Group Radio Access Network; Medium Access Control* (*MAC*) *Protocol Specification* (*Release* 5) *Version* 5.5.0" which is hereby incorporated by reference. In other words, as long as retransmissions are only sent via the multicast communication channels of the plurality of second multicast communication channels such sequence numbers are not needed.

In order to assess the advantages of the described invention, the following scheme 1, which comprises one exemplary embodiment of the invention, is considered together with scheme 2, in which the same data destined to N recipients is transmitted to the recipients via N point-to-point channels:

Scheme 1 (point-to-multipoint channel set): without any sophisticated statistical multiplexing scheme, it may be required to allocate N parallel multicast channels in order to be able to send N retransmissions, in addition to the multicast channel used for the initial transmissions of a data packet. Each recipient would need a feedback channel, via which it may transmit an acknowledgement or a negative acknowledgement indicating the request for a retransmission. The number of recipients does not influence the number of parallel multicast channels, but, of course, there are as many feedback channels required as there are recipients.

Scheme 2 (only using point-to-point channels): the multicast information is sent via point-to-point channels to the recipients, i.e. receiving stations, which requires as many point-to-point channels as there are recipients. Since the number of retransmissions does not influence the number of channels required, the number of feedback channels is the same if the concept of a point-to-multipoint channel set is applied.

Whether scheme 1 or 2 is more efficient from a channel resource point-of-view depends on the number of receiving stations and the number of retransmissions. For example, if there are only two recipients, two point-to-point channels would be sufficient without any limit for the maximum number of retransmissions. Obviously, if the maximum number of retransmissions is the same as the number of recipients, those schemes are equally efficient in terms of channel resources. If the maximum required number of retransmissions $N_{ReTxMAX}$ is small (such a threshold for the maximum number of retransmissions depends, of course, on the channel conditions), and the number of $N_{recipients}$ of recipients is larger than the number of retransmissions, the concept of the point-to-multipoint channel set has a clear advantage in terms of channel resources. Thus, with ten recipients and a maximum of four retransmissions, four multicast channels would be required to allow for a retransmission protocol, while it would be ten if point-to-point channels were used.

Apart from the fact that a channel capacity reduction may be achieved by the concept of the point-to-multipoint channel set, if $N_{ReTxMAX} < N_{recipients}$, the concept also provides a delay reduction, since the retransmissions are carried out simultaneously with the new transmissions: assuming (as above) ten recipients and $N_{ReTxMAX}=4$, all packets are received with a maximum delay of four slots. If point-to-point channels (scheme 2) are used, assuming also $N_{ReTxMAX}=4$, the overall delay may, in many cases, be higher, because when a packet needs a retransmission, the channel is occupied and subsequent packages have to wait. If the first packet needs four retransmissions, all subsequent packets are delayed by the four slots, if the second packet needs three transmissions, all subsequent packets are delayed by 4+3 slots. This may be particularly important if the packets have to be reassembled on the receiving side into a service data unit (hereinafter as usual referred to as "SDU"), which is destined for the upper layer. The SDU can only be reassembled if all its segments are received error-free. From such a point of view, it may also be feasible to apply point-to-multipoint transmission for real time services, if the maximum number of retransmissions is not too large.

According to a further aspect of the above exemplary embodiment of the present invention, in a wireless environment where receiving stations face different channel conditions in a way that, for example, those which are close to the base station receive very good signal strength, while those at cell edges have to cope with rather weak signals, a partitioning of the set of recipients may be particularly advantageous. Thus, the plurality of receiving stations within reach of the base station may be partitioned into groups of receiving stations having comparable or similar channel conditions. Comparable or similar channel conditions may relate to comparable signal strengths or to a comparable transmission delay, or to comparable interferences in the channels or elsewhere. Then, the point-to-multipoint data packet transmission may be performed by the base station (or transmitting station) for each of the groups individually. Advantageously, by grouping the receiving stations into groups, for which the maximum number of retransmissions is expected to be the same, since they have the same or comparable channel conditions, a highly efficient data transmission may be provided.

As already indicated above, the present invention may also be applied in the context of 3GPP ("3rd Generation Partnership Project") FDD mode Frequency Division Duplex mode).

The 3GPP FDD mode provides an HS-DSCH ("High Speed Downlink Shared Channel"), which may be used with code multiplexing. By this, within one slot, it is possible to transmit data to the same user, using several codes. Instead of using several codes to increase the data rate within one slot, each code channel or subsets of code channels of all codes available for one user in a slot may be used as one of the channels of a point-to-multipoint channel set, as described above. By applying HARQ type II and/or III, the retransmissions may carry only incremental redundancy, so that the interference generated by additional code channels used for the retransmissions becomes smaller than that of an additional code channel, which carries self-decodable redundancy. In addition, the spreading factor on the code channel used for an initial transmission in parallel to retransmissions for earlier packets on different parallel code channels could be increased so that for this initial transmission a smaller packet is carried in order to further reduce the overall interference resulting from the new transmission in parallel to retransmissions for earlier packets, which interference impacts neighboring cells and is generated by the cell, in which this HS-DSCH is modified so that point-to-multipoint transmission is possible.

In another transmission system with broadcast behavior, or wireless transmission system, or cellular mobile communication system, sending on different channels a retransmission for a packet in parallel or simultaneously with a new transmission or retransmissions of earlier packets, can also be performed by means of frequency division multiple access (FDMA), i.e. that for the initial transmission of a data packet always a first frequency channel is used, for the first retransmission for a data packet always a second frequency channel is used, for the second retransmission for a data packet, always a third frequency channel is used, etc.

The invention claimed is:

1. A method for performing point-to-multipoint data transmission from a transmitting station to a plurality of receiving stations, the method comprising the steps of: transmitting data from the transmitting station to the plurality of receiving stations via a first communication channel; performing a first channel switching in the transmitting station when decoding of the transmitted data fails at a receiving station of the plurality of receiving stations, from the first communication channel to a second communication channel; and retransmitting the data via the second communication channel while the first communication channel remains in use for transmitting new data: wherein multiple retransmissions automatically occur on a plurality of different predetermined channels until the data is successfully transmitted via one of the plurality of different predetermined channels, and wherein additional data is simultaneously transmitted on the first communication channel during the multiple retransmissions; and wherein after the decoding of the transmitted data fails at the receiving station, the receiving station automatically establishes a connection for retransmission on a channel of the plurality of predetermined channels without causing notification messaging to occur between the receiving station and the transmitting station.

2. The method of claim 1, wherein the data is transmitted as a data packet, the method further comprising the steps of: performing a second channel switching in at least one second receiving station of the plurality of receiving stations from the first communication channel to the second communication channel; wherein the first channel switching is performed in accordance with a first switching scheme; wherein the second channel switching is performed in accordance with a second switching scheme; and wherein the first switching scheme corresponds to the second switching scheme.

3. The method of claim 2, wherein a predefined delay time interval exists between the transmission of the data packet and the retransmission of the data packet; and wherein the delay time interval is set forth in the first and second switching schemes.

4. The method of claim 2, wherein transmission of original data packets is carried out on the first communication channel.

5. The method of claim 2, wherein, when a receiving station of the plurality of receiving stations erroneously decodes the data packet, the receiving station of the plurality of receiving stations sends a negative acknowledgement message to the transmitting station via a third communication channel; and wherein, when the transmitting station receives no negative acknowledgement message, no retransmission of the data packet is performed by the transmitting station.

6. The method of claim 2, wherein a plurality of second communication channels are provided, wherein a plurality of retransmissions of the data packet are performed via the plurality of second communication channels; and wherein each of the retransmissions of the plurality of retransmissions are carried out via a different communication channel of the plurality of second communication channels, in accordance with the first and second switching schemes.

7. The method of claim 2, wherein a plurality of second communication channels are provided, wherein a plurality of retransmissions of the data packet are performed via the plurality of second communication channels; wherein each of the retransmissions of the plurality of retransmissions is are carried out via a different communication channel of the plurality of second communication channels, in accordance with the first and second switching schemes; and wherein retransmissions of different data packets are performed simultaneously via different communication channels of the plurality of second communication channels, and simultaneously with the transmission of additional data packets via the first communication channel.

8. The method of claim 2, wherein the plurality of receiving stations in close proximity to the transmitting station are partitioned into groups of receiving stations with comparable channel conditions of the first and second communication channels; wherein the point-to-multipoint data packet transmission is performed for each of the groups individually.

9. The method of claim 2, wherein transmission and retransmission of the data is performed via a wireless communication link.

10. The method of claim 2, wherein the method is an extension of a Hybrid Automatic Repeat Request (HARQ) protocol in a Universal Mobile Telecommunications System (UMTS).

11. The method of claim 2, wherein the method is applied in a $3^{rd}$ Generation Partnership Project Frequency Division Duplex (3GPP FDD) mode; and wherein code channels provided in the 3 GPP FDD mode are used as at least one of the first and second communication channels.

12. A communication system for performing a point-to-multipoint data transmission from a transmitting station to a plurality of receiving stations, wherein the transmitting station is adapted to transmit data from the transmitting station to the plurality of receiving stations via a first communication channel; wherein the transmitting station is adapted to automatically perform a first channel switching from the first communication channel to a second communication channel when decoding of the transmitted data fails at a receiving station of the plurality of receiving stations; wherein at least one of the plurality of receiving stations is adapted to perform a second channel switching from the first communication channel to the second communication channel; wherein the transmitting station is adapted to retransmit the data via the second communication channel while the first communication channel remains in use for transmitting new data; and wherein multiple retransmissions automatically occur on a plurality of different predetermined channels until the data is successfully transmitted via one of the plurality of different predetermined channels, and wherein additional data is simultaneously transmitted on the first communication channel during the multiple retransmissions; and wherein after the decoding of the transmitted data fails at the receiving station, the receiving station automatically establishes a connection for retransmission on a channel of the plurality of predetermined channels without causing notification messaging to occur between the receiving station and the transmitting station.

13. A transmitting station for a communication system for a performing point-to multipoint data transmission to a plurality of receiving stations, wherein the transmitting station is adapted to transmit data from the transmitting station to the plurality of receiving stations via a first communication channel; wherein the transmitting station is adapted to perform a channel switching from the first communication channel to a second communication channel when decoding of the transmitted data fails at a receiving station of the plurality of receiving stations; wherein the transmitting station is adapted to retransmit the data via the second communication channel while the first communication channel remains in use for transmitting new data; and wherein multiple retransmissions automatically occur on a plurality of different predetermined channels until the data is successfully transmitted via one of the plurality of different predetermined channels, and wherein additional data is simultaneously transmitted on the first communication channel during the multiple retransmissions: and wherein after the decoding of the transmitted data fails at the receiving station, the receiving station automatically establishes a connection for retransmission on a channel of the plurality of predetermined channels without causing notification messaging to occur between the receiving station and the transmitting station.

14. A receiving station suitable to use with a communication system for receiving a data packet transmitted from a transmitter to a plurality of receiving stations by means of a point-to multipoint data transmission, wherein the receiving station is adapted to receive the data transmitted via the first communication channel; wherein the receiving station is adapted to perform a channel switching from a first communication channel to a second communication channel when decoding of the transmitted data fails at a receiving station of the plurality of receiving stations; wherein the receiving station is adapted to receive the retransmitted data via the second communication channel while the first communication channel remains in use for transmitting new data; wherein multiple retransmissions automatically occur on a plurality of different predetermined channels until the data is successfully transmitted via one of the plurality of different predetermined channels, and wherein additional data is simultaneously transmitted on the first communication channel during the multiple retransmissions; and wherein after the decoding of the transmitted data fails at the receiving station, the receiving station automatically establishes a connection for retransmission on a channel of the plurality of predetermined channels without causing notification messaging to occur between the receiving station and the transmitting station.

* * * * *